(12) United States Patent
Müller

(10) Patent No.: US 12,229,988 B2
(45) Date of Patent: Feb. 18, 2025

(54) DEVICE FOR LOCATING A COUPLING MEANS ARRANGED ON A TRAILER VEHICLE

(71) Applicant: JOST-WERKE DEUTSCHLAND GMBH, Neu-Isenburg (DE)

(72) Inventor: Mark Müller, Neu-Isenburg (DE)

(73) Assignee: JOST-WERKE DEUTSCHLAND GMBH, Neu-Isenburg (DE)

( * ) Notice: Subject to any disclaimer, the term of this patent is extended or adjusted under 35 U.S.C. 154(b) by 0 days.

(21) Appl. No.: 18/705,003

(22) PCT Filed: Oct. 27, 2022

(86) PCT No.: PCT/IB2022/060339
§ 371 (c)(1),
(2) Date: Apr. 26, 2024

(87) PCT Pub. No.: WO2023/073607
PCT Pub. Date: May 4, 2023

(65) Prior Publication Data
US 2024/0420367 A1    Dec. 19, 2024

(30) Foreign Application Priority Data
Oct. 27, 2021    (DE) .......................... 102021005348.6

(51) Int. Cl.
*G06K 9/00*    (2022.01)
*B62D 53/08*    (2006.01)
(Continued)

(52) U.S. Cl.
CPC ................ *G06T 7/73* (2017.01); *B62D 53/08* (2013.01); *G06T 7/586* (2017.01); *G06V 10/145* (2022.01);
(Continued)

(58) Field of Classification Search
CPC ........ G06V 10/145; G06T 2207/10028; G06T 2207/30252
See application file for complete search history.

(56) References Cited

U.S. PATENT DOCUMENTS 11,756,230 B2 *   9/2023   Gupta ...................... B60D 1/62
                                                        348/116
2002/0145662 A1 * 10/2002  Mizusawa ................ B60D 1/62
                                                        348/113
(Continued)

FOREIGN PATENT DOCUMENTS

DE          221693 A1 *   5/1985
DE         4413694 A1    10/1995
(Continued)

OTHER PUBLICATIONS

System Design of Time-of-Flight Range Camera for Car Park Assist and Backup Application, Sunil Acharya et al., IEEE, 2008, pp. 1-6 (Year: 2008).*

(Continued)

*Primary Examiner* — Jayesh A Patel
(74) *Attorney, Agent, or Firm* — Hudak, Shunk & Farine Co. LPA

(57) ABSTRACT

A device for locating a coupling means arranged on a trailer vehicle before the coupling operation is described, having a coupling on the towing vehicle side that is designed with an insertion opening which is open in the rearward direction (R) and is intended for the entry of the coupling means, a light transmitter fitted to the coupling on the towing vehicle side, and a light receiver which captures light from the light transmitter that is reflected by the coupling means. The problem of providing a device which can be used to make it possible for the coupling on the towing vehicle side to more precisely approach the coupling means of the trailer vehicle (Continued)

Figure 1:
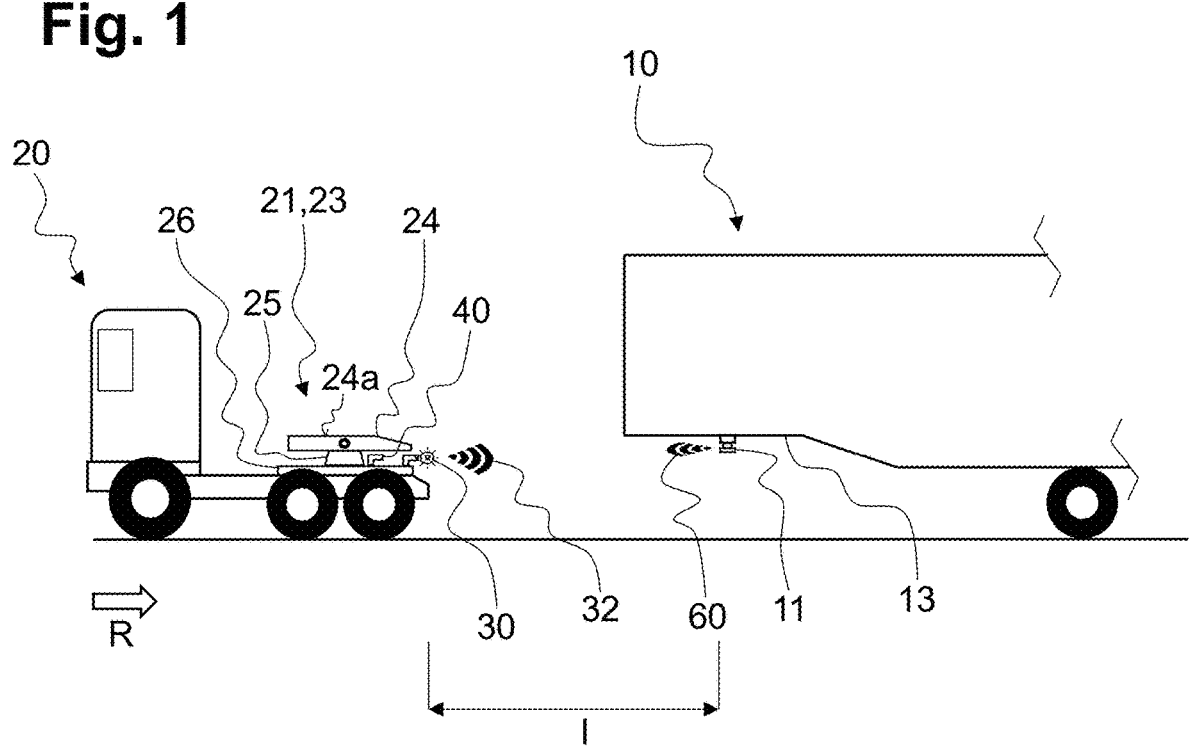

is solved by virtue of the fact that the light transmitter is a stroboscopic light.

18 Claims, 6 Drawing Sheets

(51) Int. Cl.
    *G06T 7/586*     (2017.01)
    *G06T 7/73*     (2017.01)
    *G06V 10/145*     (2022.01)
    *G06V 20/56*     (2022.01)

(52) U.S. Cl.
    CPC .... *G06V 20/56* (2022.01); *G06T 2207/10028* (2013.01); *G06T 2207/30252* (2013.01)

(56) References Cited

U.S. PATENT DOCUMENTS

| | | | |
|---|---|---|---|
| 2015/0291097 A1 | 10/2015 | O'Cualain et al. | |
| 2018/0081370 A1* | 3/2018 | Miller | B60W 10/04 |
| 2018/0147900 A1* | 5/2018 | Shank | G06T 7/60 |
| 2022/0134951 A1* | 5/2022 | Zhang | G06T 7/73 |
| | | | 348/148 |
| 2022/0355735 A1* | 11/2022 | Kroeze | B60W 60/0025 |

FOREIGN PATENT DOCUMENTS

| | | | | |
|---|---|---|---|---|
| DE | 19950808 A1 | * | 4/2001 | B60D 1/36 |
| DE | 102004029130 A1 | * | 12/2005 | B60D 1/36 |
| DE | 102016218603 A1 | * | 3/2018 | B60D 1/015 |
| EP | 1249365 A1 | * | 10/2002 | B60D 1/36 |
| WO | WO-2014186828 A1 | * | 11/2014 | B62D 53/08 |
| WO | WO-2018060192 A1 | * | 4/2018 | B60D 1/015 |
| WO | WO-2019231474 A1 | * | 12/2019 | B60D 1/015 |

OTHER PUBLICATIONS

A visual template-matching method for articulation angle measurement, Christopher de Saxe et al., IEEE, 2015, pp. 626-631 (Year: 2015).*
Luo, R., Translation and Scale Invariant Landmark Recognition Using Receptive Field Neural Networks, IEEE/RSJ International Conference on Intelligent Robots and Systems, New York, U.S., Jul. 7-10, 1992, pp. 527-533, vol. 1, XP000339050, ISBN: 978-0-7803-0738-4.

* cited by examiner

Fig. 5 Pos 1.2 & Pos 2.3.4
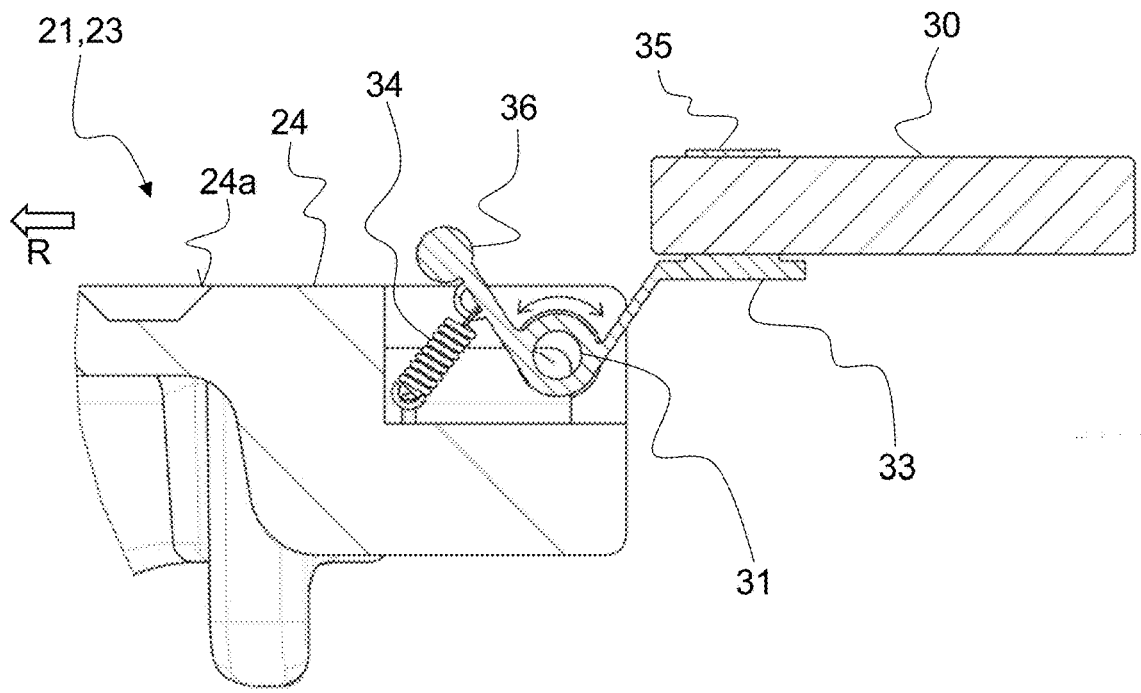
Fig. 6 Pos 2
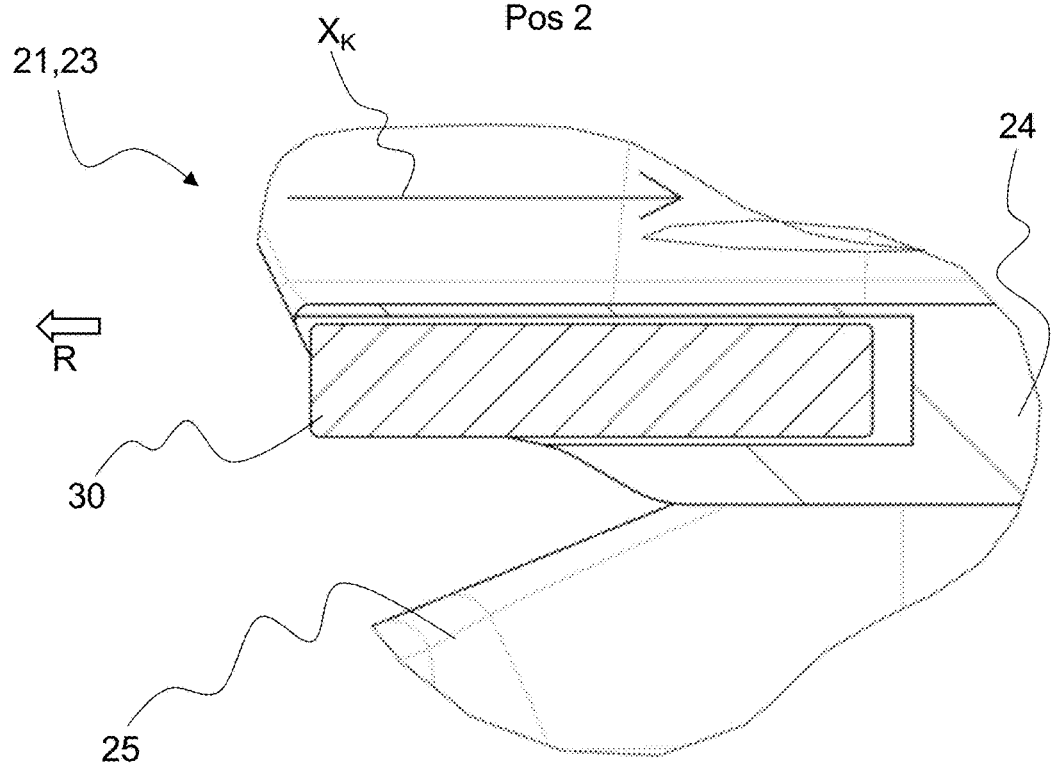

Pos 2.1.1 & Pos 2.2

Pos 2.1.2

Pos 2.3.1

Pos 2.3.2

Pos 2.3.3

DEVICE FOR LOCATING A COUPLING MEANS ARRANGED ON A TRAILER VEHICLE

The invention relates to a device for locating a coupling means arranged on a trailer vehicle before the coupling operation in accordance with the features of the preamble of claim 1.

A towing vehicle is usually fitted with a coupling on the towing vehicle side and the trailer vehicle also has a coupling means compatible with the coupling, via which a mechanical connection to the coupling on the towing vehicle side can be established. When coupled, the trailer vehicle and the towing vehicle are rotatably but detachably connected to one another. The trailer vehicle can in particular be a semi-trailer with a coupling means in form of a kingpin attached to it. In this case, the towing vehicle has a fifth wheel coupling into which the kingpin is inserted and then locked.

The coupling operation is often problematic, as the towing vehicle approaches the stationary trailer vehicle while driving backwards and the coupling on the towing vehicle side must precisely pick up the coupling means of the trailer vehicle. A coupling means that appears to have been inserted correctly into the coupling but is not completely locked in the coupling is particularly dangerous. In this case, there is a risk that the trailer vehicle will uncontrollably detach from the towing vehicle and become independent when driving at speed. The driver of the towing vehicle is therefore obliged to make sure that the coupling is in the correct condition before setting off, which is difficult because the locking mechanism of the coupling is barely visible, especially with fifth wheel couplings, and the driver has to crawl under the semi-trailer in order to be able to assess the locking condition at all. In the state of the art, efforts have therefore already been made to indicate that the coupling means has been correctly inserted into the coupling and locked in the coupling or to specify the correct approach of the towing vehicle from the outset using technical aids.

Document WO 2016/186841 A1 proposes using two sensors to monitor the position of the kingpin and the locking mechanism and, in the event of correct locking, to illuminate the area under a coupling plate, so that visual inspection is easier for the driver and no flashlight is required. However, it has proven to be disadvantageous that in the event of incorrect alignment of the coupling on the towing vehicle side and the coupling means on the trailer side, significant damage to both the coupling or the towing vehicle as well as the coupling means and the trailer vehicle can occur before the actual coupling operation.

Document DD 221 693 A1 discloses a device for orienting vehicles when steering in close proximity to reference objects that are largely out of sight. At least in one embodiment it is provided to arrange a light-optical transmitter and a light-optical receiver together as a functional unit on a vehicle. To redirect the light beam, a concave mirror should be arranged stationary to the drawbar of the trailer. In practice, however, it has been found that even a slight misalignment of the concave mirror does not result in any usable function of the known device.

Document DE 199 50 808 A1 describes a device and a method for connecting a trailer to a towing vehicle. Among other things, a transmitter and three laterally offset receivers can be arranged in a rear area of the towing vehicle in close proximity to the coupling mouth.

The measurement signal should be reflected by a reflective element and thrown back to the transmitter, where the receiver or receivers is/are also located. An ultrasonic transmitter or other types of transmitter signals such as radio signals or laser beams are mentioned as possible transmitters. However, an approach for coupling the towing vehicle and trailer vehicle on the basis of the transmitter signals used in the older device has not yet worked satisfactorily.

Consequently, the invention addressed the problem of providing a device which can be used to make it possible for the coupling on the towing vehicle side to more precisely approach the coupling means of the trailer vehicle.

The underlying object of the invention is solved with the features of claim 1. While the towing vehicle is approaching the trailer vehicle and before contact is made with a coupling means of the trailer, a light transmitter in the form of a stroboscopic light attached to the coupling on the towing vehicle side is activated. The coupling means of the trailer vehicle is found by a light receiver, which is also arranged on the towing vehicle, detecting light reflected from the coupling means by the stroboscopic light.

The stroboscopic light is a flash device that emits flashes of light at predetermined time intervals. As a result, especially in relatively dark ambient conditions, movement appears choppy as a sequence of stationary images. Due to this effect, a position determination of the coupling means can be carried out particularly precisely using the stroboscopic light as a light source. The flashes of light emitted in particular have a constant flash frequency. However, it is also possible to generate a group of light flashes of a first frequency, which is followed by one or further groups, each with a different frequency. The stroboscopic light preferably generates a flash frequency of 1 Hz to 1,000 Hz, particularly preferably 5 Hz to 100 Hz, very particularly preferably 10 Hz to 50 Hz.

The installation position of the stroboscopic light on the towing vehicle-side coupling has the advantage that the light emitted by the stroboscopic light is emitted as far as possible at the rear of the towing vehicle and is not covered by the towing vehicle-side coupling itself or other attachments. The close proximity of the stroboscopic light to the coupling on the towing vehicle also enables the reflected light to be detected for as long as possible, as the stroboscopic light only passes over the kingpin at a late stage in the case of a fifth wheel coupling, for example, and the reflected light therefore remains visible for longer than if it is attached to the rear of the towing vehicle, for example.

In particular in the case of a semi-trailer, the coupling means is arranged in the form of a kingpin on the underside of a semi-trailer floor, covered by the semi-trailer and thus is largely shaded. The kingpin itself typically has a shiny metallic surface that reflects the light emitted by the stroboscopic light particularly well. This reflected light is picked up by the light receiver and thus the coupling means of the trailer vehicle is detected.

Preferably, the stroboscopic light is aligned in such a way that the emitted light is emitted in the rearward direction with respect to the coupling on the towing vehicle side. This results in a particularly high yield of reflected light for the light receiver and a particularly accurate identification of the coupling means. The term "rearward direction" refers to a fan with an opening angle of 180° against the direction of travel. This fan can also have a smaller opening angle of, for example, a maximum of 90° or particularly preferably a maximum of 60°. Ideally, the fan is reduced to a line-like light emission in the longitudinal axis of the towing vehicle.

In addition to visible light, the stroboscopic light can also emit light in the infrared spectrum or be a laser. Suitable light of a defined spectrum is IR light in a frequency range from 780 nm to 1000 nm, particularly preferably 800 nm to 900 nm, very particularly preferably from 820 nm to 880 nm. The laser can in particular be a short-range laser operating in a frequency range of 905 nm to 1000 nm. White light, in particular from a halogen lamp, with a luminous flux of at least 1550 lm and a color temperature of at least 3200 k can also be used.

According to a particularly favorable embodiment, the coupling on the towing vehicle side is a fifth wheel coupling, wherein the stroboscopic light is attached to a coupling plate, to one of two bearing blocks or to a mounting plate of the fifth wheel coupling.

It can also be provided that the stroboscopic light is pivotally attached to the coupling plate. The stroboscopic light is then preferably attached to a pivotally mounted holder. The swiveling mounting of the stroboscopic light makes it possible to use of a mounting position that can only be used before the trailer vehicle is coupled but is in the area of influence of the trailer vehicle during and after coupling, so that a permanently mounted stroboscopic light would be destroyed by the trailer vehicle. With the help of the pivoting holder, the stroboscopic light moves out of the area of influence of the trailer vehicle. The pivoting movement of the holder together with the stroboscopic light can be triggered by the trailer vehicle, for example by parts of the trailer vehicle such as the trailer plate hitting the pivotally mounted holder and thereby causing a change in position. A pivoting attachment of the stroboscopic light allows a largely free choice of the mounting position in the area of the vehicle's longitudinal axis of the towing vehicle, whereby the coupling means of the trailer vehicle is illuminated particularly centrally and the reflected light is detected in spatial proximity to the stroboscopic light from the light receiver.

If the stroboscopic light or its pivotally mounted holder are spring-loaded relative to the coupling plate, the stroboscopic light assumes its original, upright position after uncoupling the trailer vehicle and is ready for a new coupling operation.

The light receiver is advantageously arranged on the coupling on the towing vehicle side and is particularly preferably also attached to it. This means that the light receiver and stroboscopic light are in close proximity to each other, which maximizes the detectable range of an approaching coupling means, as the light receiver and the stroboscopic light are passed over simultaneously by a kingpin, for example, and from this point on no more reflected light can be picked up by the light receiver.

It makes sense for the light receiver to be aligned in such a way that the light reflected from the rear direction is detected. This means that the light receiver and stroboscopic light are aligned in the same effective direction.

It has proven to be particularly useful when the light receiver is a camera or a photocell.

The stroboscopic light and the light receiver are preferably integrated into a common structural unit. A common structural unit can in particular represent a common housing. In any case, in this embodiment, the stroboscopic light and the light receiver are mounted in the operational position on a common support element, which in turn is attached to the coupling on the towing vehicle side.

It is particularly advantageous if the common structural unit comprises a plurality of stroboscopic lights which are preferably arranged offset in the circumferential direction around the light receiver. Advantageously, there are four stroboscopic lights, which are arranged evenly distributed around the light receiver in the circumferential direction. As a result, a particularly homogeneous light is emitted around the light receiver and a relatively strong reflected light is generated.

In the installed position, the stroboscopic light and the light receiver can be arranged on opposite sides, symmetrically to the vehicle's longitudinal axis of the coupling on the towing vehicle side. In this case, the stroboscopic light and the light receiver are not integrated into a common unit, but are installed in different mounting positions. The lateral deviation from the vehicle's longitudinal axis should be the same for the stroboscopic light and the light receiver so that the emitted light of the stroboscopic light striking the coupling means of the trailer vehicle at an angle of incidence emits approximately the same reflection angle as reflected light and can be detected by the light receiver.

In principle, if visible light is emitted by the stroboscopic light and the light receiver is a camera, the device could interact with a display device arranged in the driver's cab. However, an electronic evaluation unit is advantageously provided, by means of which a presence of the coupling means is determined from a mean reflection cloud of the reflected light received by the light receiver. The mean reflection cloud images all reflective points of light on the surface of the coupling means on the trailer vehicle. The brightest point detected by the light receiver therefore also represents the position of the coupling means.

The electronic evaluation unit can in particular determine a height of the mean reflection cloud. This results in the advantage that the distance to the coupling means can be calculated from the height of the mean reflection cloud using the electronic evaluation unit.

It makes sense to use the electronic evaluation unit to evaluate the contour on both sides of the mean reflection cloud and verify the coupling means. This makes it possible to identify the type of coupling device installed on the trailer and its structural condition. For example, it can be recognized whether a kingpin with a diameter of 2.5', 3.5' or 5' is installed on a semi-trailer. This information can in turn be used to carry out a compatibility check in the evaluation unit and to indicate to the operator whether the trailer vehicle can be coupled to the towing vehicle.

Figure 2:
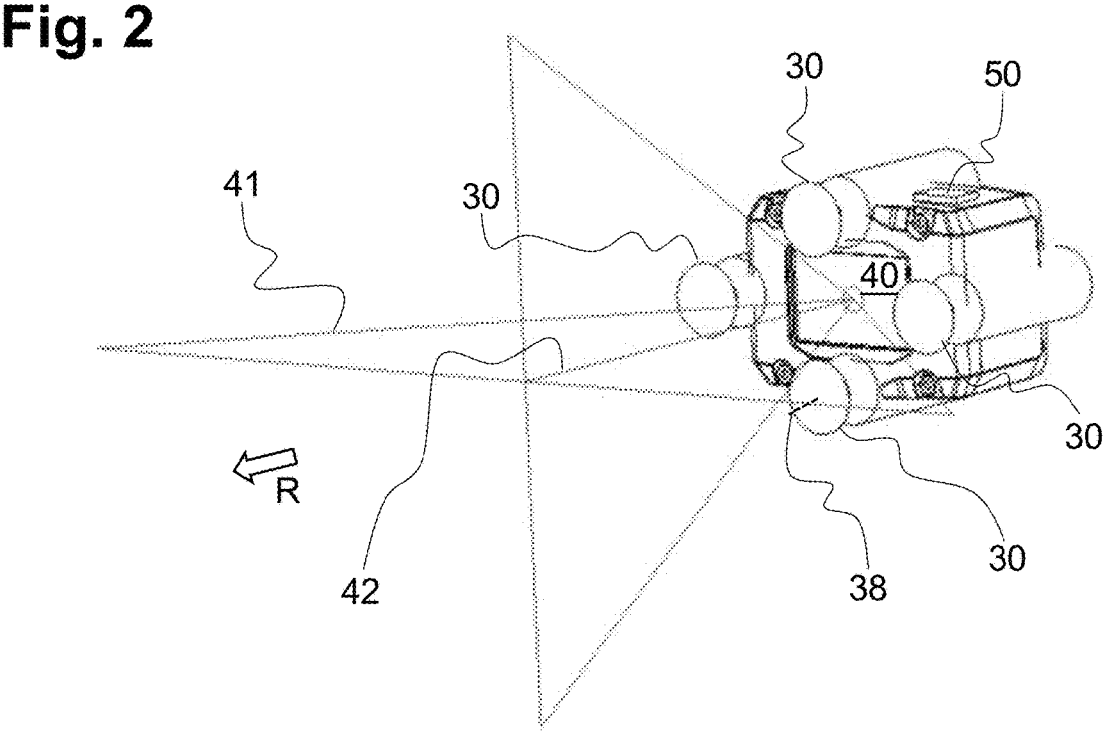
Figure 3:
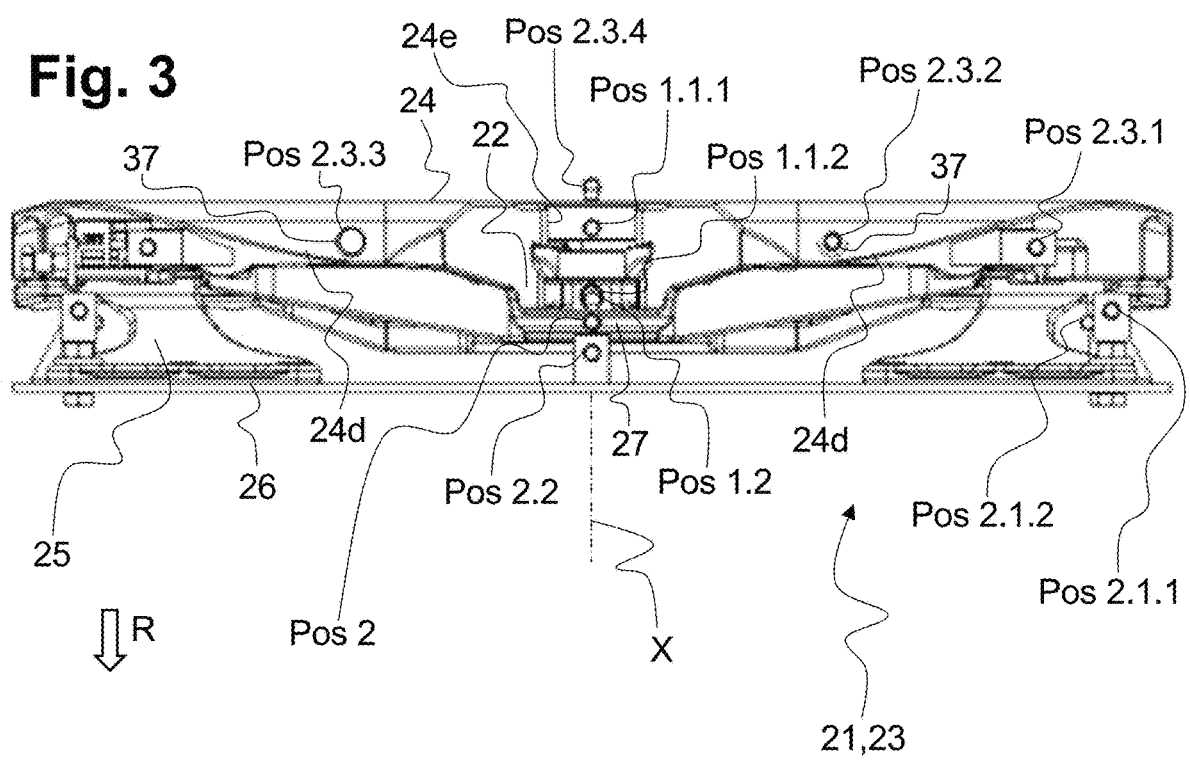
Figure 4:
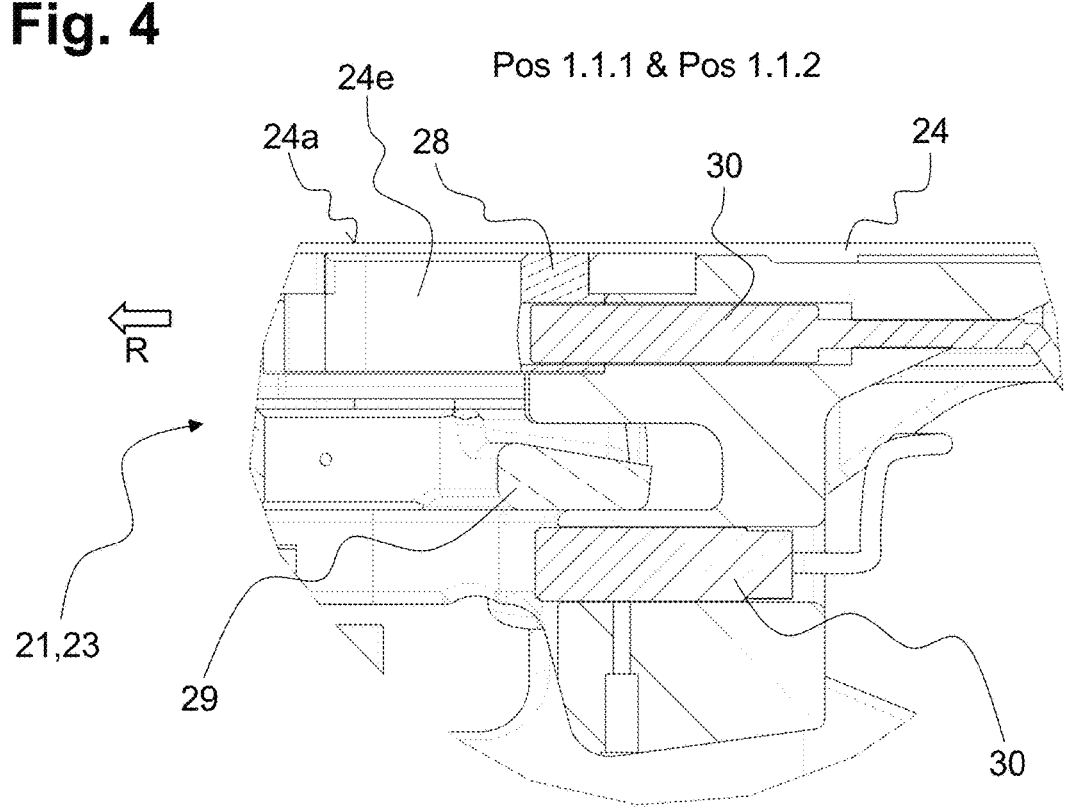
Figure 7:
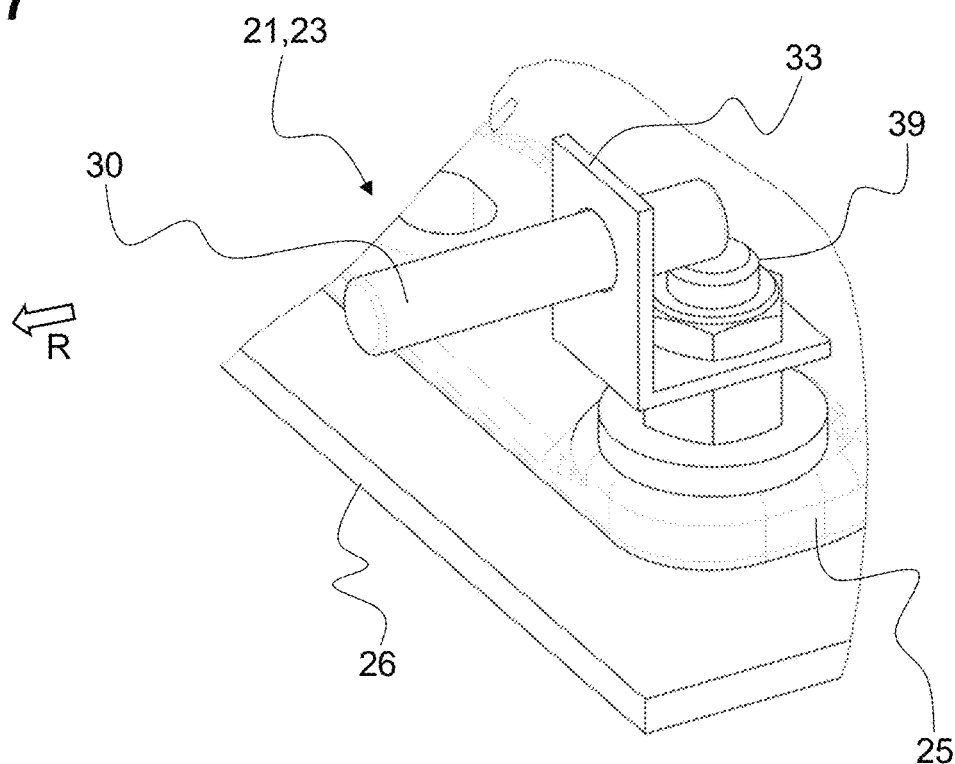
Figure 8:
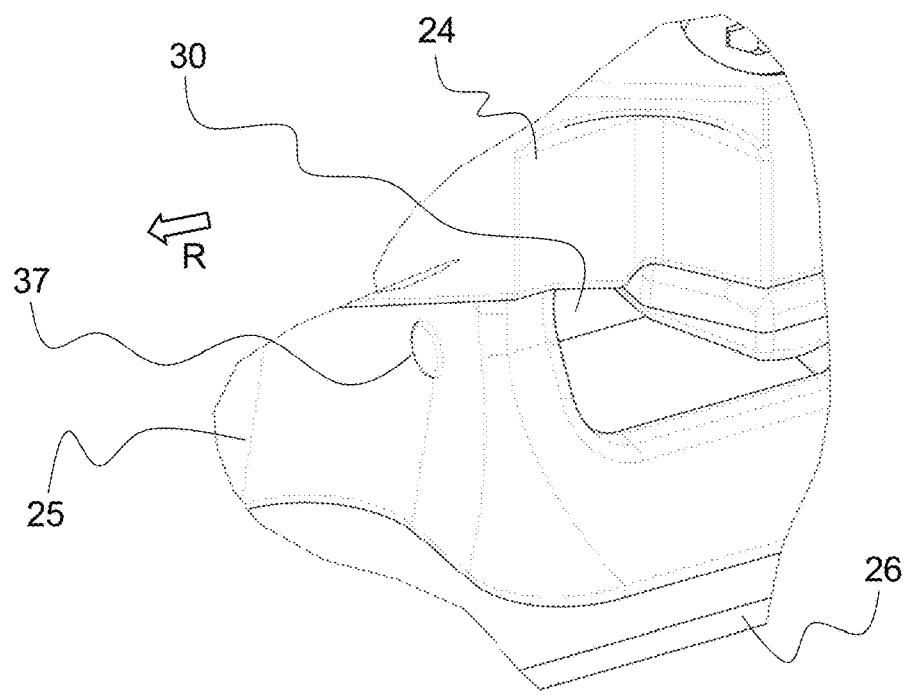
Figure 9:
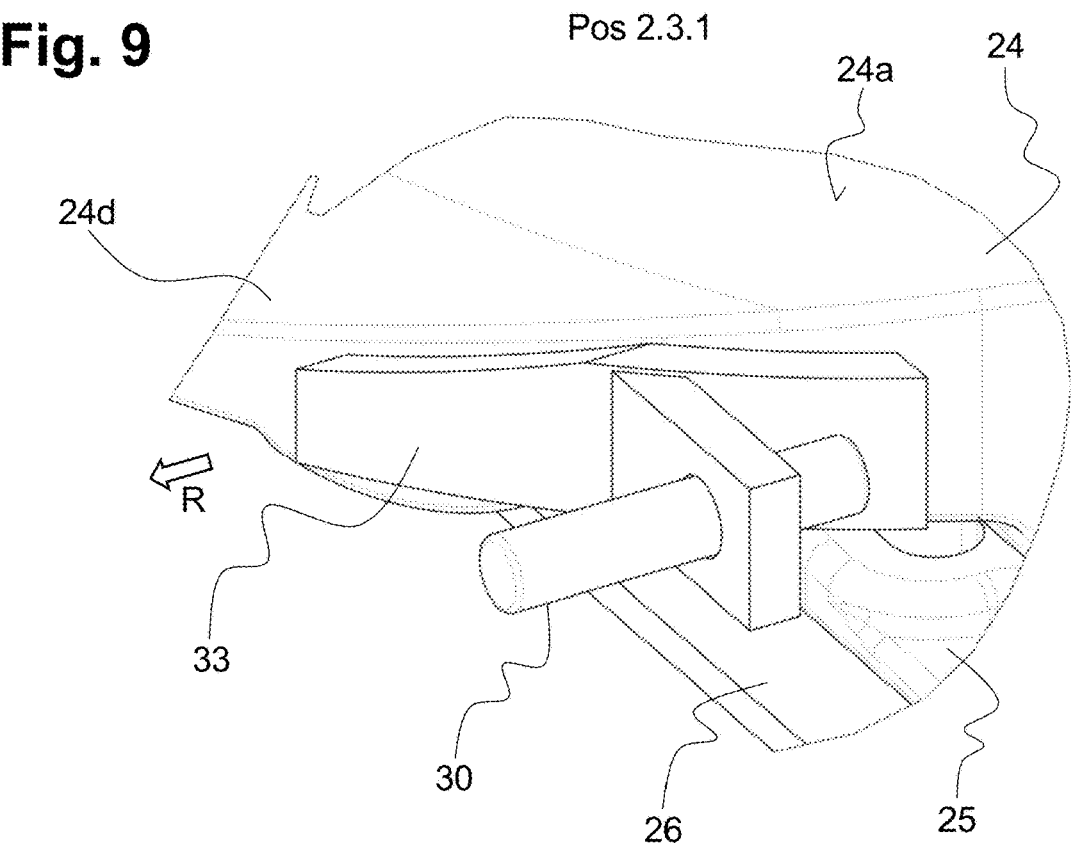
Figure 10:
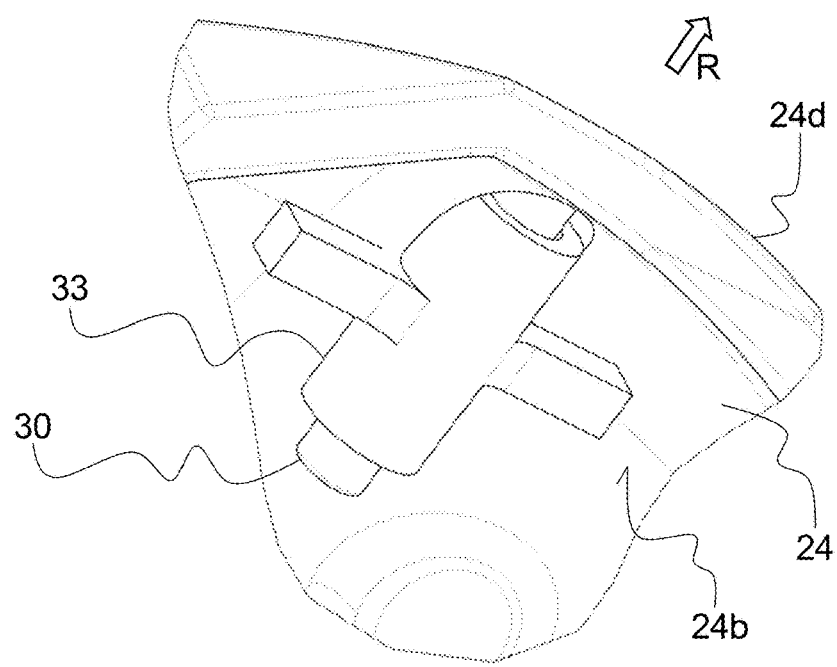
Figure 11:
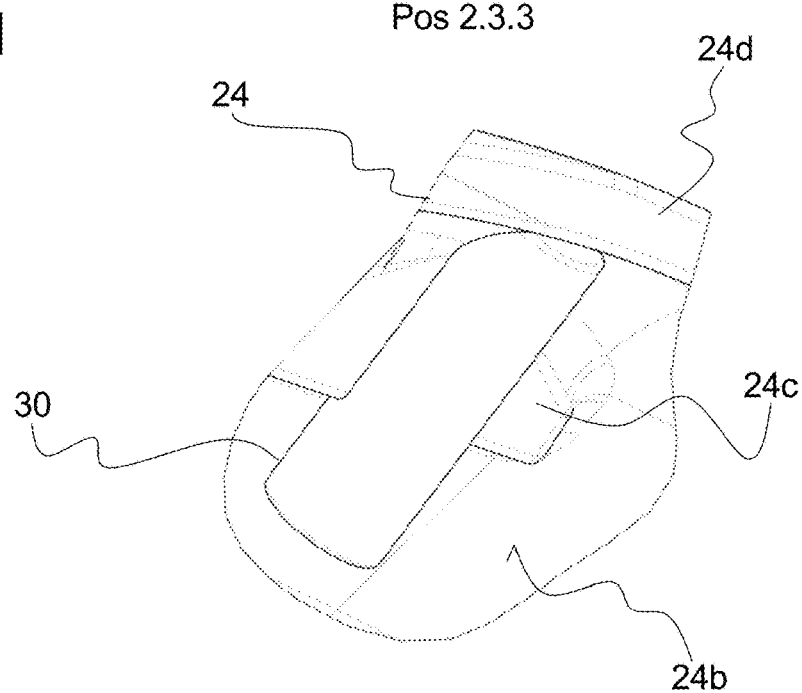
Figure 12:
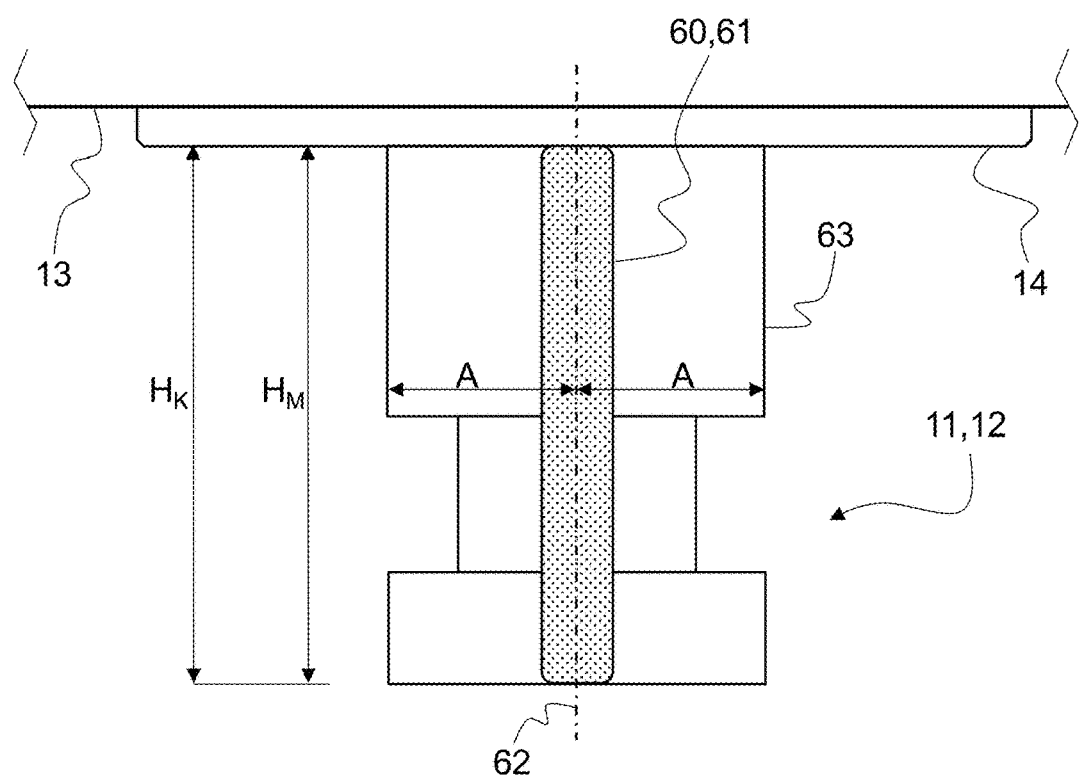

For better understanding, the invention is explained in more detail below using 12 Figures. They show in FIG. 1: a side view of a towing vehicle with a stroboscopic light and a light receiver spaced from a trailer vehicle before the coupling process;

FIG. 2: a perspective view of a common structural unit with several stroboscopic lights arranged around a light receiver;

FIG. 3: a rear view of a fifth wheel coupling with several possible mounting positions for a stroboscopic light;

FIG. 4: an enlarged detail of a cross section through the mounting positions for a stroboscopic light according to Pos 1.1.1 and Pos 1.1.2 in FIG. 3;

FIG. 5: an enlarged detail of a cross section through the mounting positions for a stroboscopic light according to Pos 1.2 and Pos. 2.3.4 in FIG. 3;

FIG. 6: an enlarged detail of a cross section through the mounting positions for a stroboscopic light according to Pos 2 in FIG. 3;

FIG. 7: an enlarged detail of a perspective top view of the mounting positions for a stroboscopic light according to Pos 2.1.1 and Pos 2.2 in FIG. 3;

FIG. 8: an enlarged section of a perspective top view of the mounting positions for a stroboscopic light according to Pos 2.1.2 in FIG. 3;

FIG. 9: an enlarged section of a perspective top view of the mounting positions for a stroboscopic light according to Pos 2.3.1 in FIG. 3;

FIG. 10: an enlarged section of a perspective bottom view of the mounting positions for a stroboscopic light according to Pos 2.3.2 in FIG. 3;

FIG. 11: an enlarged detail of a perspective bottom view of the mounting positions for a stroboscopic light according to Pos 2.3.3 in FIG. 3 and FIG. 12: a front view of a kingpin illuminated by the stroboscopic light with a mean reflection cloud.

FIG. 1 shows a side view of a towing vehicle 20 spaced from a trailer vehicle 10 in the form of a semi-trailer before the coupling operation. The trailer vehicle 10 comprises a kingpin 12 as a coupling means 11, which protrudes downwards relative to a trailer plate 13 of the trailer vehicle 10 attached to the underside of the trailer vehicle 10. For the coupling operation, in which a mechanical connection with the trailer vehicle 10 is established, the towing vehicle 20 approaches the trailer vehicle 10 in a rearward direction R until the kingpin 12 reaches a coupling 21 on the towing vehicle side and is locked there.

The coupling 21 on the towing vehicle side is a fifth wheel coupling 23, which comprises a coupling plate 24, two bearing blocks 25 engaging laterally on the coupling plate 24, via which the coupling plate 24 is attached to the towing vehicle 20, and a mounting plate 26, which is fastened to a vehicle frame not shown and carries the two bearing blocks 25. After the coupling operation has ended, the trailer plate 13 rests on an upper side 24a of the coupling plate 24 and is supported on the towing vehicle 20.

Both a light transmitter 30 in the form of a stroboscopic light 30 and a light receiver 40 are arranged on the coupling 21 on the towing vehicle side, wherein both of which are aligned in the rearward direction R. By flashing the coupling means 11 of the trailer vehicle 10, in particular the kingpin 12, by means of light 32 emitted by the stroboscopic light 30 and recording a light 60 reflected from the coupling means 11 by means of the light receiver 40, in particular a camera or photocell, it is possible to determine a distance I of the coupling means 11 of the trailer vehicle 10 to the towing vehicle 20.

As shown in the exemplary embodiment according to FIG. 2, the stroboscopic light 30 and the light receiver 40 can be combined in a common structural unit. The common structural unit includes a housing in or to which the stroboscopic light 30 and the light receiver 40 are permanently attached. In the exemplary embodiment shown, four stroboscopic lights 30 are provided, which are arranged in a ring around the light receiver 40.

The light receiver 40 has a fan-like detection range 41 and an optical center axis 42 running in the rearward direction R. Optical center axes 38 of the stroboscopic light(s) 30 also run in the rearward direction R and are aligned axially parallel to the optical center axis 42 of the light receiver 40.

In addition, an electronic evaluation unit 50 is arranged in the common structural unit of stroboscopic light 30 and light receiver 40, with the help of which the coupling means 11 of the trailer vehicle 10 is identified and, if necessary, a distance to the coupling means 11 is calculated. The evaluation unit 50 can also be attached separately from the stroboscopic light 30 and/or the light receiver 40 at another location on the towing vehicle 20, in particular on its coupling 21 on the towing vehicle side.

FIG. 3 shows an example of a fifth wheel coupling 23 as a coupling 21 on the towing vehicle side in a rear view with several possible mounting positions Pos 1.1.1, Pos 1.1.2, Pos 1.2, Pos 2.3.4, Pos 2, Pos 2.1.1, Pos 2.2, Pos 2.1.2, Pos 2.3.1, Pos 2.3.2, Pos 2.3.3 for the at least one stroboscopic light 30, each of which is explained with further details in the following FIG. 4 to FIG. 11. If the stroboscopic light 30 and the light receiver 40 are integrated in a common structural unit, this can also be attached in one of the proposed mounting positions.

The coupling plate 24 has two entry horns 24d molded onto it and extending in the rearward direction R, which laterally delimit an insertion opening 22 lying between them and conically widened in the rearward direction R. As the towing vehicle 20 steadily approaches, the kingpin 12 enters the insertion opening 22 and is guided into a locking area 24e of the coupling plate 24 until it reaches its end position. Starting from the flat upper side 24a of the coupling plate 24, the entry horns 24d are formed with a downwardly sloping, ramp-shaped upper side, on which a low-standing trailer plate 13 can slide to its final height position during the coupling operation.

FIG. 4 illustrates the mounting positions Pos 1.1.1 and Pos 1.1.2 for the stroboscopic light 30 in an enlarged cross section. In Pos 1.1.1, the stroboscopic light 30 is inserted into a wear ring 28, which is designed with a light passage opening 37 for this purpose. The wear ring 28 surrounds the locking area 24e in a horseshoe shape and is only open in the rearward direction R, so that the kingpin 12 can be guided from the insertion opening 22 into the locking area 24e.

The stroboscopic light 30 is arranged inside the wear ring 28, set back from the locking area 24e, and the light passage opening 37 is formed between the stroboscopic light 30 and the locking area 24e in order to prevent the kingpin 12 from colliding with the stroboscopic light 30, particularly during braking maneuvers, as the wear ring 28 wears and an associated loss of material occurs. In addition, the recessed attachment of the stroboscopic light 30 within the wear ring 28 ensures reduced contamination of the stroboscopic light 30.

The mounting of the stroboscopic light 30 within the wear ring 28 is located in a vehicle longitudinal axis X, so that a kingpin 12 can be detected particularly favorably in a rearward direction behind the towing vehicle 20.

FIG. 4 also shows an alternative or additional mounting position Pos 1.1.2 for a stroboscopic light 30, in which the stroboscopic light 30 is also installed in the longitudinal axis X in the coupling plate 24, but under a locking hook 29 of the locking mechanism. In the vertical direction, the locking hook 29 and the stroboscopic light 30 overlap at least partially in an open position of the locking hook 29. The light 32 emitted by the stroboscopic light 30 shines through and/or under the insertion opening 22 of the coupling plate 24 in the direction of the kingpin 12.

FIG. 5 shows an alternative or supplementary mounting position Pos 2.3.4, which would in principle also be possible in mounting position Pos 1.2 and is also located in the vehicle's longitudinal axis X.

In the mounting position Pos 2.3.4, the stroboscopic light 30 is attached to a flexible holder 33, which holds the stroboscopic light 30 in a functional position shown above a level of the upper side 24a of the coupling plate 24 without the presence of a trailer vehicle 10. When parts of the trailer vehicle 10 approach, such as the trailer plate 13 or a kingpin 12 that is too high, the corresponding part of the trailer vehicle 10 interacts with the flexible holder 33 in such a way that the stroboscopic light 30 is pushed below the level of the upper side 24a of the coupling plate 24.

In the exemplary embodiment shown in FIG. 5, the flexible holder 33 is attached to the coupling plate 24 by means of a pivot bearing 31 and is held in the raised functional position by a spring element 34. A contact arm 36 extends in the rearward direction R, the free end of which projects over the upper side 24a of the coupling plate 24. The spring element 34 is fastened between the holder 33 and the coupling plate 24 and is in a contracted state in the raised functional position. The stroboscopic light 30 is rigidly connected to a holder attachment 35 which is angularly aligned with the contact arm 36 and which holds the stroboscopic light 30 above the level of the upper side 24a of the coupling plate 24, so that the light 32 emitted by the stroboscopic light 30 radiates across the coupling plate 24 towards the kingpin 12.

As the towing vehicle 20 approaches the stationary trailer vehicle 10, the trailer plate 13 in particular passes over the fifth wheel coupling 23, slides over the upper side 24a of the coupling plate 24 and strikes the free end of the contact arm 36. As a result, the flexible holder 33 is rotated around its pivot bearing 31 (clockwise in the illustration according to FIG. 5), and dips below the level of the upper side 24a of the coupling plate 24. This reliably prevents damage to the stroboscopic light 30.

During uncoupling the trailer vehicle 10, the trailer plate 13 moves in the rearward direction R over the upper side 24a of the coupling plate 24 and releases the contact arm 36, which then swings back due to the pretension of the spring element 34, so that the holder attachment 35, in the illustration according to FIG. 5 counterclockwise, also straightens up and the stroboscopic light 30 is again above the level of the upper side 24a of the coupling plate 24.

The embodiment with a flexible holder 33 according to FIG. 5 can in principle also be realized on a connecting bridge 27 bridging the two entry horns 24d under the insertion opening 22 corresponding to the assembly position Pos 1.2. During coupling a trailer vehicle 10, its kingpin 12 passes over the connecting bridge 27 with a small vertical clearance, which would destroy a stroboscopic light 30 arranged rigidly thereon. By attaching the stroboscopic light 30 to a flexible holder 33, it is possible to use the favorable position of the stroboscopic light 30 in the area of the vehicle's longitudinal axis X and still swivel the stroboscopic light 30 out of the area of influence of the kingpin 12. In this mounting position Pos 1.2, the kingpin 12 would push the flexible holder 33 out of the upright position.

The embodiment according to FIG. 6 provides, with the mounting position Pos 2, an alternative or additional rigid mounting of the stroboscopic light 30 within the connecting bridge 27. In this mounting position Pos 2, the stroboscopic light 30 is also located in the vehicle's longitudinal axis X and is at least partially overhung by the connecting bridge 27 in the rearward direction R, so that the stroboscopic light 30 is always protected from the kingpin 12 and other parts of the trailer vehicle 10 that could collide with it, even if the trailer vehicle 10 is incorrectly coupled. The kingpin 12 moving into the coupling plate 24 passes over the connecting bridge 27 in the entry direction $X_K$.

FIG. 7 shows an alternative or supplementary mounting position Pos 2.1.1, which can in principle also be used in the mounting position Pos 2.2. In both mounting positions Pos 2.1.1 and Pos 2.2, the stroboscopic light 30 is attached indirectly (Pos 2.1.1) or directly to the mounting plate 26 by means of a rigid holder 33. The rigid holder 33 is designed as an angle with a horizontal leg and an upright leg, the horizontal leg being penetrated by a fastening screw 39 and the vertical leg carrying the stroboscopic light 30. In the illustration of Pos 2.1.1 according to FIG. 7, one of the bearing blocks 25 is also fixed to the mounting plate 26 with the fastening screw 39. This attachment of the stroboscopic light 30 is inevitably arranged laterally offset from the vehicle's longitudinal axis X.

If the holder 33 is fastened directly to the mounting plate 26 together with the stroboscopic light 30, an alignment in the vehicle's longitudinal axis X according to Pos 2.2 can preferably also be provided. In this mounting position Pos 2.2, there is sufficient free installation space in the vertical direction so that a kingpin 12 of the trailer vehicle 10 entering the coupling plate 24 during coupling moves over the holder 33 mounted in the vehicle's longitudinal axis X together with the stroboscopic light 30.

FIG. 8 shows a supplementary or alternative mounting position Pos 2.1.2, in which the stroboscopic light 30 is rigidly integrated into one of the bearing blocks 25. For this purpose, the bearing block 25 has a light passage opening 37 formed in the rearward direction R, through which light 32 emitted by the stroboscopic light 30 can pass. The stroboscopic light 30 is located on an inside of the bearing block 25 facing the vehicle's longitudinal axis X and is therefore particularly well protected against damage and external influences.

FIG. 9 shows a supplementary or alternative mounting position Pos 2.3.1, in which a rigid holder 33 is attached to the side of the coupling plate 24 together with the stroboscopic light 30. The holder 33 and the stroboscopic light 30 are arranged below a vertical level of the upper side 24a of the coupling plate 24 and the entry horns 24d. It is particularly preferred to attach the holder 33 and the stroboscopic light 30 to the side next to the entry horns 24d, since from there the light 32 emitted by the stroboscopic light 30 hits the trailer vehicle 10 in the rearward direction R without any obstacles.

FIG. 10 shows a supplementary or alternative mounting position Pos 2.3.2, in which the stroboscopic light 30 is fastened by means of a rigid holder 33 on the underside 24b of the coupling plate 24, in particular under one of the entry horns 24d. The light 32 emitted by the stroboscopic light 30 emerges in the rearward direction R from a light passage opening 37 which is aligned with the stroboscopic light 30 in the coupling plate 24, in particular in the respective entry horn 24d. Due to the perspective bottom view of FIG. 10, the light passage opening 37 formed in the downwardly sloping, ramp-shaped upper side of the entry horn 24d cannot be seen (see FIG. 3). Each entry horn 24d is arranged laterally offset from the vehicle's longitudinal axis X, so that a stroboscopic light 30 inserted therein also has a laterally offset position from the vehicle's longitudinal axis X.

The mounting position shown in FIG. 11, Pos 2.3.3, largely corresponds to Pos 2.3.2 and differs only in that the stroboscopic light 30 is not inserted into a rigid holder 33, but into a stiffening rib 24c arranged on the underside 24b of the coupling plate 24, in particular in the area of the entry horns 24d.

FIG. 12 shows a front view of a kingpin 12 of a coupling means 11 arranged on a trailer vehicle 10. The kingpin 12 is flashed by emitted light 32 from the stroboscopic light 30 and correspondingly reflected light 60 is temporarily visible on its surface. The reflected light 60 can be seen as a strip-shaped mean reflection cloud 61 over the entire axial height $H_K$ of the kingpin 12.

The light receiver 40 is connected to the electronic evaluation unit 50 indicated by way of example in FIG. 2. For example, the electronic evaluation unit 50 identifies the mean reflection cloud 61, which is significantly brighter than the surroundings, by means of image recognition software located thereon and thereby finds the coupling means 11 of the trailer vehicle 10. The electronic evaluation unit 50 determines the distance I to the coupling means 11 of the trailer vehicle 10 from a height $H_M$ of the mean reflection cloud 61.

It is optionally also possible to carry out a contour evaluation of the image provided by the light receiver 40 and the electronic evaluation unit 50 after locating the coupling means 11, for example the kingpin 12, by means of the electronic evaluation unit 50. With a kingpin 12 as coupling means 11, the contour evaluation includes an evaluation of the edge distances A on both sides of a center line 62 of the mean reflection cloud 61 to the recognizable outer visible edge 63 of the kingpin 12 and a classification of the kingpin 12 according to its dimensions with a diameter of 2.5', 3.5' or 5'. This classification can be followed by a plausibility check as to whether the coupling means 11 found is suitable to be accommodated by the coupling 21 on the towing vehicle side.

LIST OF REFERENCE NUMERALS 10 trailer vehicle
11 trailer vehicle coupling means
12 kingpin
13 trailer plate
14 mounting flange
20 towing vehicle
21 coupling on the towing vehicle side
22 insertion opening
23 fifth wheel coupling
24 coupling plate
24a upper side of coupling plate
24b underside of coupling plate
24c stiffening rib coupling plate
24d entry horns coupling plate
24e locking area coupling plate
25 bearing block
26 mounting plate
27 connecting bridge insertion opening
28 wear ring
29 locking hook
30 light transmitter/stroboscopic light
31 pivot bearing
32 emitted light
33 holder stroboscopic light
34 spring element holder
35 holder attachment for stroboscopic light
36 contact arm
37 light passage opening
38 optical center axis stroboscopic light
39 fastening screw holder
40 light receiver
41 detection range light receiver
42 optical center axis light receiver
50 electronic evaluation unit
60 reflected light
61 mean reflection cloud
62 center line mean reflection cloud
63 outer visible edge kingpin
A edge distance kingpin
$H_K$ height kingpin
$H_M$ height of mean reflection cloud
I distance to coupling means
R rearward direction
X vehicle longitudinal axis
$X_K$ entry direction kingpin

What is claimed is:

1. A device for locating a coupling means arranged on a trailer vehicle before the coupling operation, comprising;
   a coupling on a towing vehicle side that is designed with an insertion opening which is open in the rearward direction (R) and is intended for the entry of the coupling means,
   a light transmitter fitted to the coupling on the towing vehicle side, and
   a light receiver which captures light from the light transmitter that is reflected by the coupling means,
   wherein the light transmitter is a stroboscopic light,
   wherein an electronic evaluation unit is provided, by which, from a mean reflection cloud of the reflected light received by the light receiver, a presence of the coupling means and a height ($H_M$) of the mean reflection cloud and from the height ($H_M$) of the mean reflection cloud a distance (I) to the coupling means is determined.

2. The device according to claim 1, wherein the stroboscopic light is aligned in such a way that the emitted light is emitted in the rearward direction (R) with respect to the coupling on the towing vehicle side.

3. The device according to claim 1, wherein the coupling on the towing vehicle side is a fifth wheel coupling, wherein the stroboscopic light is attached to a coupling plate, one of two bearing blocks or a mounting plate of the fifth wheel coupling.

4. The device according to claim 3, wherein the stroboscopic light is pivotally attached to the coupling plate.

5. The device according to claim 1, wherein the light receiver is arranged on the coupling on the towing vehicle side.

6. The device according to claim 1, wherein the light receiver is aligned in such a way that the reflected light from the rearward direction (R) is captured.

7. The device according to claim 1, wherein the light receiver is a camera or a photocell.

8. The device according to claim 1, wherein the stroboscopic light and the light receiver are integrated into a common structural unit.

9. The device according to claim 8, wherein the common structural unit comprises a plurality of stroboscopic lights which are arranged offset in the circumferential direction around the light receiver.

10. The device according to claim 1, wherein the stroboscopic light and the light receiver are arranged in the installed position on opposite sides, symmetrically to the vehicle's longitudinal axis (X) of the coupling on the towing vehicle side.

11. The device according to claim 1, wherein a contour evaluation on both sides of the mean reflection cloud and a verification of the coupling means are carried out by means of the electronic evaluation unit.

12. The device according to claim 2, wherein the coupling on the towing vehicle side is a fifth wheel coupling, wherein the stroboscopic light is attached to a coupling plate, one of two bearing blocks or a mounting plate of the fifth wheel coupling, and wherein the stroboscopic light is pivotally attached to the coupling plate.

13. The device according to claim 12, wherein the light receiver is arranged on the coupling on the towing vehicle side.

14. The device according to claim 13, wherein the light receiver is aligned in such a way that the reflected light from the rearward direction (R) is captured, and wherein the light receiver is a camera or a photocell.

15. The device according to claim 14, wherein the stroboscopic light and the light receiver are integrated into a common structural unit, and wherein the common structural unit comprises a plurality of stroboscopic lights which are arranged offset in the circumferential direction around the light receiver.

16. The device according to claim 14, wherein the stroboscopic light and the light receiver are arranged in the installed position on opposite sides, symmetrically to the vehicle's longitudinal axis (X) of the coupling on the towing vehicle side.

17. The device according to claim 15, wherein a contour evaluation on both sides of the mean reflection cloud and a verification of the coupling means are carried out by means of the electronic evaluation unit.

18. The device according to claim 16, wherein a contour evaluation on both sides of the mean reflection cloud and a verification of the coupling means are carried out by means of the electronic evaluation unit.

\* \* \* \* \*